S. ROSENFELD.
FAUCET SUPPORTING COLLAR.
APPLICATION FILED JUNE 4, 1917.
1,339,982.
Patented May 11, 1920.
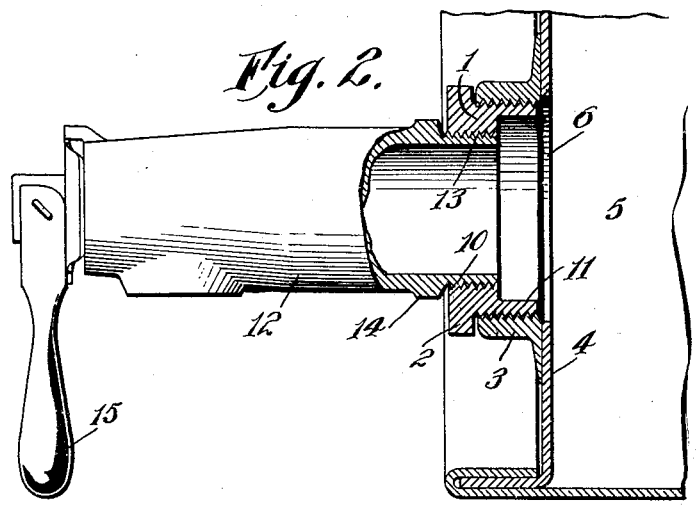
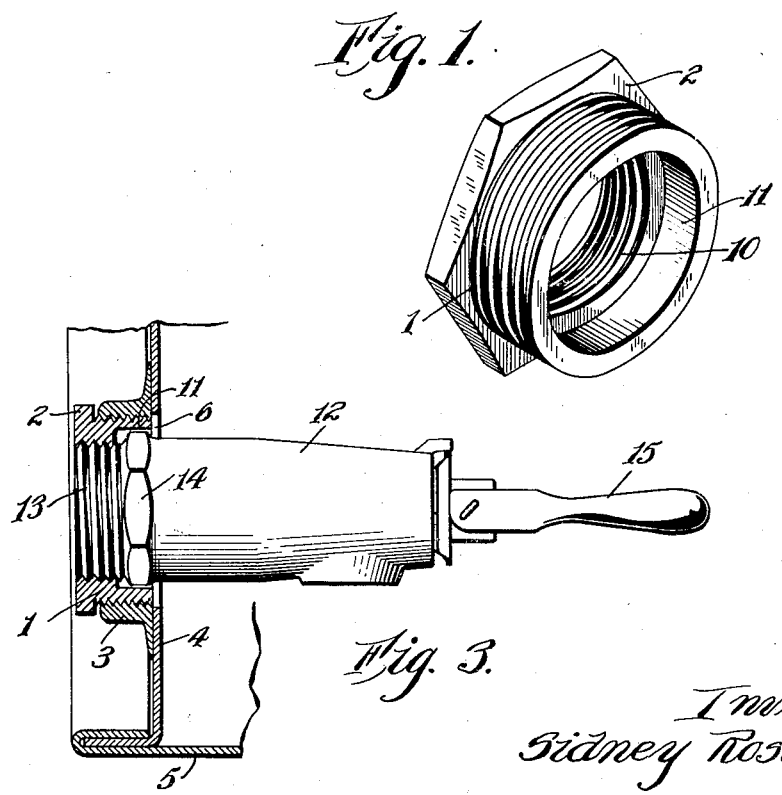
Inventor,
Sidney Rosenfeld.
By Hull, Smith, Brock & West
Attys.

UNITED STATES PATENT OFFICE.

SIDNEY ROSENFELD, OF CLEVELAND, OHIO.

FAUCET-SUPPORTING COLLAR.

1,339,982.  Specification of Letters Patent.  Patented May 11, 1920.

Application filed June 4, 1917. Serial No. 172,563.

*To all whom it may concern:*

Be it known that I, SIDNEY ROSENFELD, a citizen of the United States, residing at Cleveland, in the county of Cuyahoga and State of Ohio, have invented a certain new and useful Improvement in Faucet-Supporting Collars, of which the following is a full, clear, and exact description, reference being had to the accompanying drawings.

This invention relates to improved means for attaching faucets to containers of various sorts, such as barrels or kegs. More particularly the invention relates to that class of attaching means which enables the faucet to be secured within the bung hole of the container either in operative condition, or in a reversed position projecting into the container where it is out of the way during storage and shipment.

The invention has for its objects to minimize parts and expense, while attaining efficiency and convenience of use in faucet attaching or supporting means of the class referred to.

I have inferred above that it is old to provide means for supporting faucets in bung holes either inside or outside the containers; but devices for accomplishing this end at present in use comprise a number of parts, some such parts being required only when the faucet is in one condition and discarded when the position of the faucet is changed.

My improved faucet attaching or supporting means consists of a single element, adapted to be received by the bung hole of a container, and from the inner or outer side of which the faucet may be supported.

In the accompanying drawing, which forms a part hereof, Figure 1 is a perspective view of my improved faucet attaching or supporting means; Fig. 2 is a fragmentary section through a container to which a faucet is attached by means of the device of my invention, the faucet being shown in operative condition; and Fig. 3, is a view, similar to Fig. 2, showing the faucet supported inside the container.

Describing the invention by use of reference characters, 1 represents the faucet supporting or attaching means, which I shall term a collar, the same having a wrench receiving flange 2 at its outer end. The collar is threaded externally for insertion into the threaded aperture of a bushing 3 that is shown as applied to the wall 4 of a container 5, and which surrounds the bung hole 6. The collar 1 has a central bore that is threaded at 10 adjacent its outer end, and which is enlarged toward its inner end as indicated at 11. This enlargement obviously saves metal and provides a recess into which the wrench receiving flange of the faucet is contained when the faucet is reversed for insertion into the container.

The faucet is designated 12, and is threaded at 13, and adjacent its threaded portion is provided with a wrench receiving enlargement or flange 14. The thread 10 of the bore of the collar is continuous and obviously may receive the threaded portion 13 of the faucet from either the inner or outer side of the collar. The faucet has an operating handle 15 which is shown as capable of being turned into alinement with the faucet, in which condition it is placed when the faucet is to be inserted into the container, wherefore the handle will offer no interference while inserting the faucet through the bung hole. When the faucet is projected into the container it is of course "turned off" or in closed condition so that it, with the collar, constitutes an effective closure for the bung hole.

From the foregoing it will be seen that by invention provides a very simple and inexpensive device for supporting a faucet from the bung hole of a container either inside or outside the container, and which is extremely convenient of manipulation.

Having thus described my invention, what I claim is:—

The combination of a faucet having a wrench receiving portion and a reduced threaded extension therebeyond, and an externally threaded attaching collar designed to be screwed into the threaded bung hole of a container for convenient removal therefrom, the collar having a bore that is threaded adjacent its outer end for the reception of the threaded extension of the faucet from either the inner or outer end of the collar, the bore being enlarged adjacent its inner end for the accommodation of the wrench receiving portion of the faucet when the latter is disposed beyond the inner end of the collar.

In testimony whereof, I hereunto affix my signature in the presence of two witnesses.

SIDNEY ROSENFELD.

Witnesses:
J. H. REIK,
WM. S. BOYER.